United States Patent
Sharma et al.

(10) Patent No.: US 9,977,808 B2
(45) Date of Patent: May 22, 2018

(54) INTENT BASED REAL-TIME ANALYTICAL VISUALIZATIONS

(71) Applicant: SAP SE, Walldorf (DE)

(72) Inventors: Vimal Sharma, Shimla (IN); Debasish Panda, Berhampur (IN)

(73) Assignee: SAP SE, Walldorf (DE)

( * ) Notice: Subject to any disclaimer, the term of this patent is extended or adjusted under 35 U.S.C. 154(b) by 315 days.

(21) Appl. No.: 14/746,818

(22) Filed: Jun. 22, 2015

(65) Prior Publication Data

US 2016/0371317 A1 Dec. 22, 2016

(51) Int. Cl.
*G06F 17/30* (2006.01)
*G06Q 10/06* (2012.01)

(52) U.S. Cl.
CPC .. *G06F 17/30345* (2013.01); *G06F 17/30554* (2013.01); *G06Q 10/067* (2013.01)

(58) Field of Classification Search
None
See application file for complete search history.

(56) References Cited

U.S. PATENT DOCUMENTS

| 6,779,060 B1 | 8/2004 | Azvine et al. |
| 7,197,460 B1 * | 3/2007 | Gupta .................. G10L 15/22 704/251 |
| 7,401,087 B2 * | 7/2008 | Copperman ...... G06F 17/30616 707/737 |
| 7,912,816 B2 | 3/2011 | Guha et al. |
| 8,266,148 B2 | 9/2012 | Guha et al. |
| 8,335,778 B2 | 12/2012 | Ghosh et al. |
| 8,468,491 B2 | 6/2013 | Markovic |
| 8,868,590 B1 * | 10/2014 | Donneau-Golencer .......... G06F 17/3053 707/733 |
| 2002/0143524 A1 * | 10/2002 | O'Neil .................. G06F 17/271 704/9 |
| 2009/0187845 A1 | 7/2009 | Middelfart |
| 2010/0070448 A1 * | 3/2010 | Omoigui ............. H01L 27/1463 706/47 |
| 2010/0094844 A1 | 4/2010 | Cras |
| 2012/0259891 A1 | 10/2012 | Edoja |
| 2014/0108304 A1 * | 4/2014 | Heidasch .......... G06F 17/30731 706/12 |
| 2014/0149446 A1 * | 5/2014 | Kuchmann-Beauger .......... G06F 17/30389 707/763 |
| 2014/0257545 A1 | 9/2014 | Tanna et al. |
| 2015/0317318 A1 * | 11/2015 | Hadzhiyski ......... G06F 17/3064 707/752 |

(Continued)

*Primary Examiner* — Wilson Lee
(74) *Attorney, Agent, or Firm* — Buckley, Maschoff & Talwalkar LLC

(57) ABSTRACT

Various embodiments of systems and methods to provide intent based real-time analytical visualizations are described herein. In one aspect, a requirement statement is received at real-time to generate visualization analysis. Further, an analytical requirement statement is generated from the received requirement statement by natural language processing. The analytical requirement statement is mapped with a unique analytical profile of a user associated with the requirement statement and corresponding business data artifacts, and the visualization analysis is generated based on the mapping information. The generated visualization analysis is displayed on a computer generated graphical user interface (GUI).

20 Claims, 8 Drawing Sheets

(56) References Cited

U.S. PATENT DOCUMENTS

| | | | |
|---|---|---|---|
| 2015/0317610 A1* | 11/2015 | Rao | G06Q 10/1053 |
| | | | 705/321 |
| 2015/0356626 A1* | 12/2015 | Chawla | H04W 4/025 |
| | | | 705/14.66 |
| 2016/0179967 A1* | 6/2016 | Sa | G06F 17/30687 |
| | | | 707/730 |
| 2016/0180728 A1* | 6/2016 | Clark | G06F 17/2785 |
| | | | 434/362 |
| 2016/0299975 A1* | 10/2016 | Acar | G06F 17/30519 |

* cited by examiner

Get [Tile] Type for [Sale] measure for [APAC] Variant except [Singapore] Filter/ not equal to / on click get [Chart] Type with details [Per Quarter] Dimension

FIG. 5

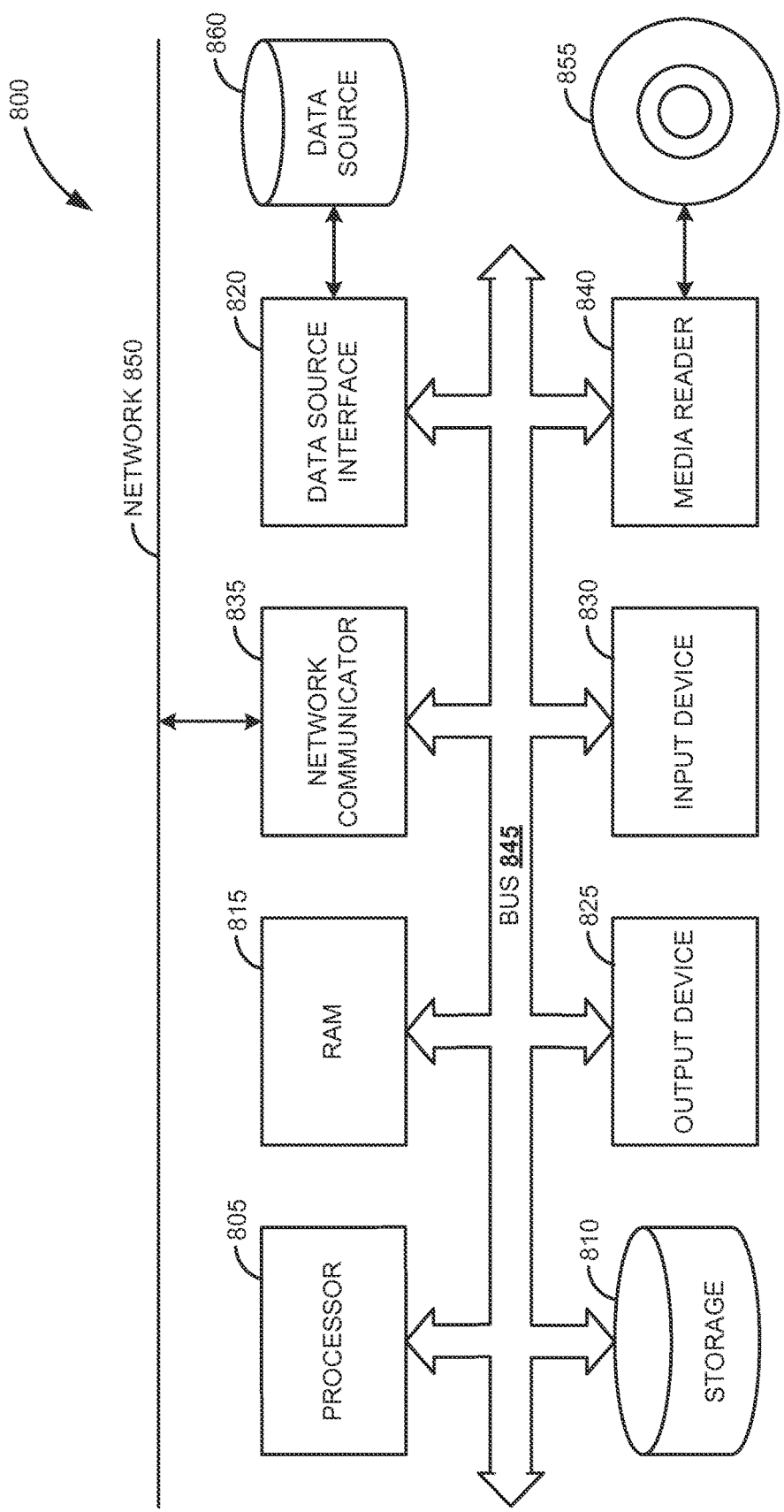

INTENT BASED REAL-TIME ANALYTICAL VISUALIZATIONS

FIELD

Embodiments generally relate to computer systems, and more particularly to methods and systems to provide intent based real-time analytical visualizations.

BACKGROUND

Strategy management is one example of a number of applications designed to manage and improve performance of an organization on a strategic and operational level. Further, the strategy management provides an overall direction and perspectives to enable the organization to achieve strategic objectives through visualization analysis such as key performance indicators (KPI), adhoc dashboards, chart visualizations and the like. For example, each perspective may have one or more objectives and corresponding metrics to measure the performance of the objectives. The metrics are called KPI or key success indicators (KSI) or performance indicators (PI) or lead indicators utilized to visualize status and trends of the objectives of the organization.

During design-time, a data analyst may individually create the KPI, and configure the KPI for a particular context and need of a user. Further, for each additional instance in which the KPI is to be used within the organization, the data analyst recreates and reconfigures the KPI, even if the recreated KPI is nearly identical to the already created KPI. The process, therefore, may become redundant because the data analyst may have the same KPI used in different projects, in the same department or across different departments, and in different hierarchical levels of the organization, but still have to create and configure the KPI for each particular instantiation.

Further, such configurations and creations of the KPI are performed during the design-time. However, the final KPI reports on the objectives operate in a real-time environment. For example, the user may ask for the KPI. Further based on the business, the requirement including modification for minor changes across already created KPI during design-time is taken care by the data analysts, which can be resource intensive.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 shows an exemplary analytical requirement statement, according to an embodiment.

FIG. 8 is a block diagram of an exemplary computer system, according to an embodiment.

DETAILED DESCRIPTION

Embodiments of techniques to provide intent based real-time analytical visualizations are described herein. Reference throughout this specification to "one embodiment". "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
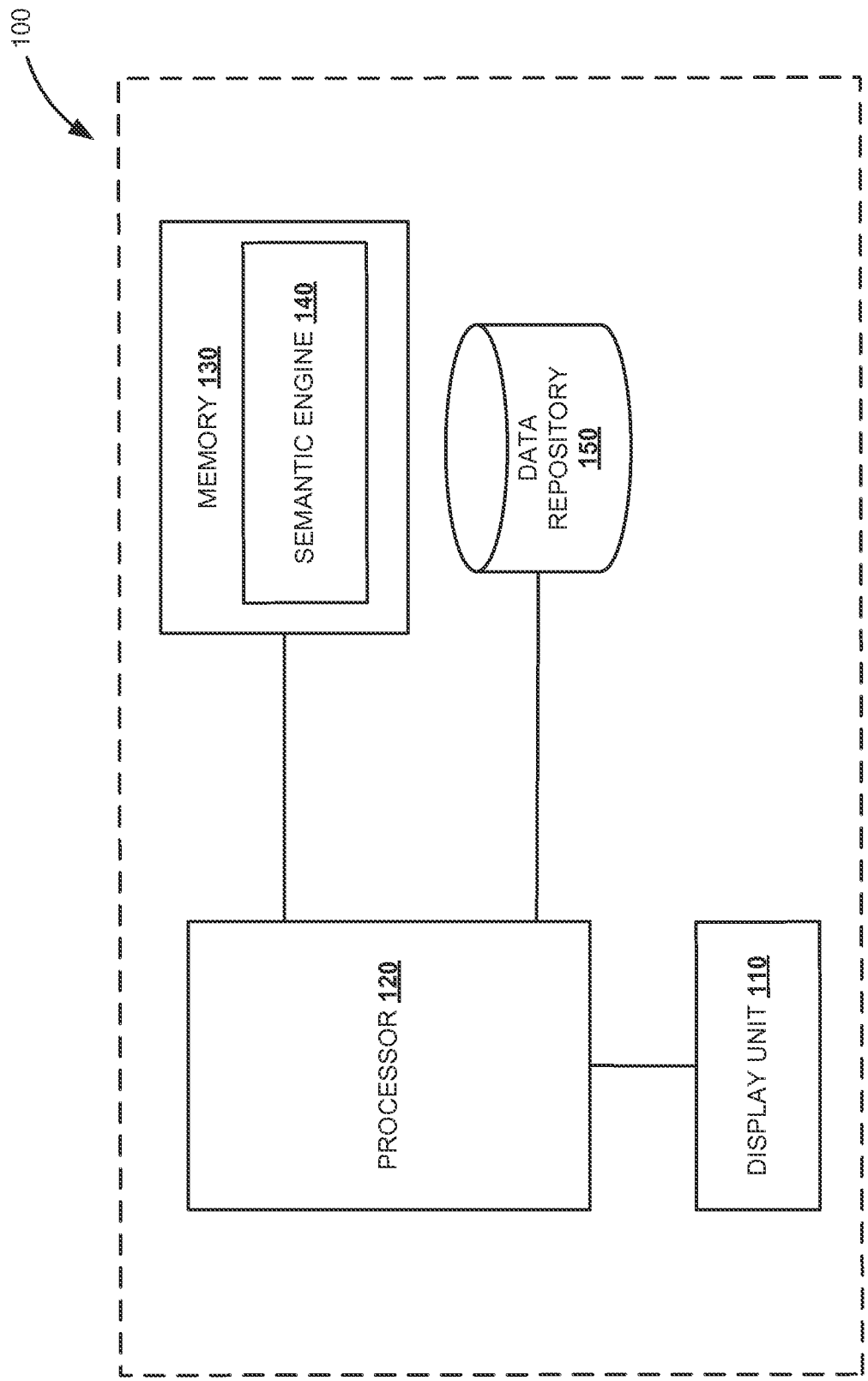
FIG. 1 is a block diagram of a special purpose computer system configured to provide intent based visualization analysis, according to an embodiment.

FIG. 1 is a block diagram of a special purpose computer system 100 configured to provide intent based visualization analysis, according to an embodiment. The computer system 100 includes at least one computer processor 120 or "CPU" that is in electronic communication with a non-transitory computer-readable storage medium (e.g., memory 130) through a high speed memory bus, for instance. In one exemplary embodiment, the computer-readable storage medium stores thereon code corresponding to an interface engine and a database engine. Further, the code may be configured to reference data stored in a database of the non-transitory computer-readable storage medium, for example as may be present locally or in a remote database server. Software servers together may form a cluster or logical network of computer systems programmed with software programs that communicate with each other and work together in order to process requests.

The processor 120 executes the instructions stored in the memory by accessing relevant data stored in data repository 150. In one embodiment, the memory 130 includes semantic engine 140, which can be a module of computer program instructions, to provide intent based visualization analysis. One example of the visualization analysis is key performance indicators (KPIs). The KPIs may provide insight of key business objectives in a field such as, but not limited to Sales, Marketing, Financial, Manufacturing. Information Technology Operations, Supply chain Management, Government, Insurance, Healthcare, Call Center, Social Media, and Business Intelligence.

Further, the semantic engine 140 may, depending upon the implementation, be part of a user device, an application, another application, a module of the server or another computer system. Additionally, it should be understood that the semantic engine 140 can be implemented on another device rather than on the user device. For example, the semantic engine 140 can be implemented on the user device such as a personal computer, tablet, cell phone or other mobile device, that reads intent and then performs the various processes described below for generating and displaying the visualization analysis corresponding to the intent on graphical user interface (GUI) of the user device.

In one embodiment, intent or requirement statement is received from a user. The requirement statement states an interest of the user in evaluating the KPI and the requirement statement can be written in natural language. Further, the term "natural language" as used herein refers to any human language used by users to communicate with each other.

Further, an analytical requirement statement is generated by parsing the received requirement statement using a set of pre-defined analytical vocabulary. The analytical requirement statement is based on a formal constructed language designed to communicate instructions to the computing system. Based on the generated analytical requirement statement, the visualization analysis is provided in accordance with the user's profile. In other words, in the real-time environment, a Unique Analytical Profile (UAP) is associated with each of the users. In one exemplary embodiment, the UAP is a personalized filter set, which includes personal information and business data. According to an example embodiment, a UAP includes more than the personal information and the business data depending on the KPI application. As an example, an additional part of a UAP would provide clearance level privileges to prevent non-authorized users from seeing confidential data related to the organization. The personal information includes information related to the user's basic identifying information such as location, employee identification number, and languages spoken. The business data includes information related to the user specifically having to do with business information, such as projects and products of interest. Accordingly, visualization analysis data (e.g., KPI data) is cascaded through the UAP of the user and thereby is filtered so that the user is only provided with contextual data relevant to a personal and business profile of the user.

With implementation of the UAPs, individualized production of numerous KPIs, each having a varying scope, is not necessary. Instead, all restrictions related to privileges and scope can be automatically implemented and formulated during real-time with UAPs. By implementing the UAPs in real-time, the system additionally avoids stalls in the analysis of data that arise due to restructuring of the KPIs in the design time environment. Further, the generated KPIs based on the intent and the UAP are displayed on the GUI of display unit 110 of the computer system 100. Thereby, the method provides the KPIs relevant to the user based on the intent during real-time and circumvents designing of the KPIs during design-time.

Figure 2:
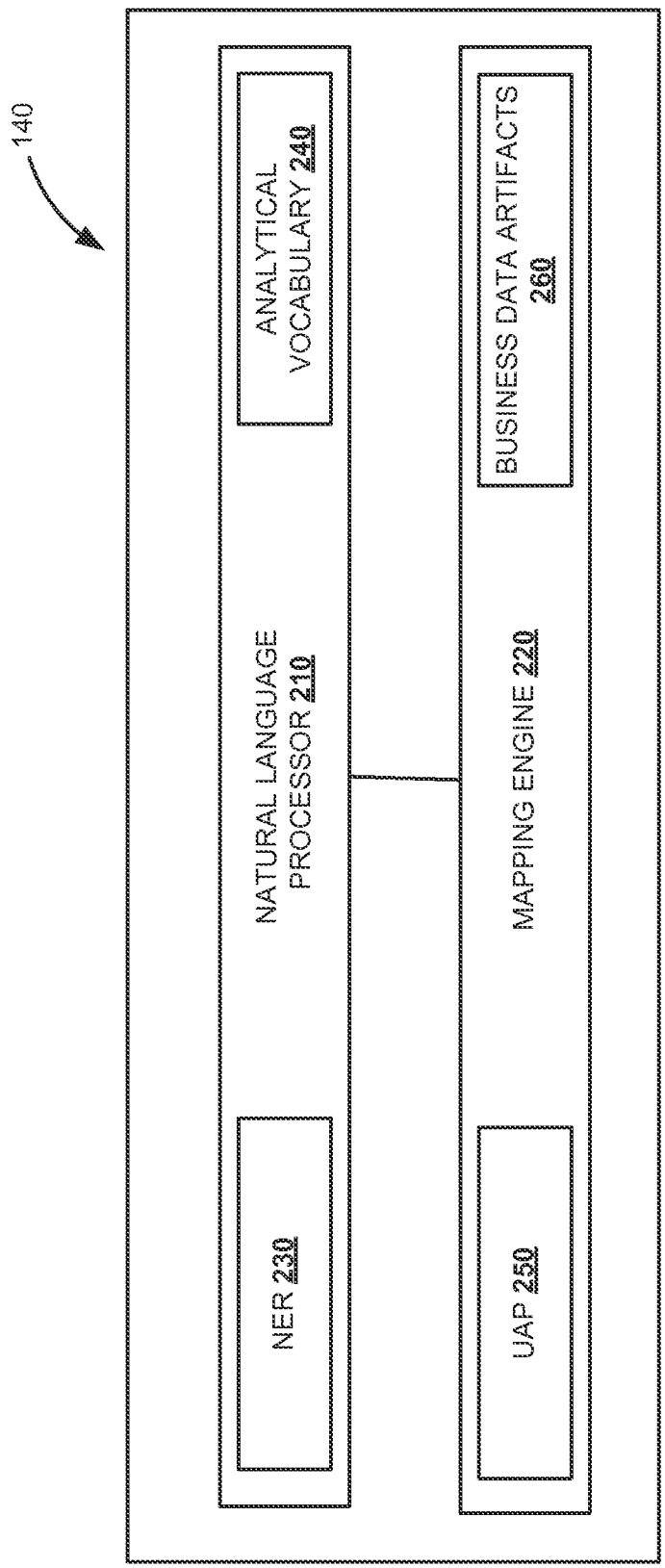
FIG. 2 is a block diagram of an exemplary semantic engine of FIG. 1, according to an embodiment.

FIG. 2 is a block diagram of exemplary semantic engine 140 of FIG. 1, according to an embodiment. The semantic engine 140 includes natural language processor 210 and mapping engine 220 to provide visualization analysis through key performance indicators (KPIs), adhoc dashboards, chart visualizations and the like. Intent or requirement statement received from a user is processed by the natural language processor 210 and the mapping engine 220.

In one embodiment, the natural language processor 210 includes named entity recognition (NER) 230 and pre-defined analytical vocabulary 240 to generate an analytical requirement statement corresponding to the requirement statement. The requirement statement is in the form of natural language. For example, when the requirement statement "I want to calculate profit from Asia region" is received, the requirement statement is analyzed and broken down to generate the analytical requirement statement using natural language processor 210. The natural language processor 210 uses the NER 230 for identifying analytical entities by assigning analytical constructs with data artifacts based on the pre-defined analytical vocabulary 240. The analytical entities can be, but not limited to types, measures, dimensions, and variants. As used herein, the term "dimension" refers to a structure that categorizes facts and measures. Examples of dimension include products, people, financial elements, time and the like. For example, a sales report may be viewed across the dimension of a product, a store, geography, a date, a quantity, revenue generated, and the like. A measure is a measurement data that can be manipulated usually denoted in some metric, for example, units, currency, etc. A measure, such as sales revenue, can be assessed for a dimension such as a customer, a product and/or a geography. For example, in a sales report, "quantity count" can be displayed for dimension "product". Other measures may include sum of sales revenue, count of a store, and the like. A measure may be a result of an aggregation of identical measures for a dimension. For instance, measure "revenue" may be displayed for dimension "year". Here, the measure describes an aggregation of all the revenues for the entire year. A measure can also be displayed for each of the values or records within a dimension. A value or a record may be described as a quantity (for example, numeric quantity) that has been defined for a particular instance of the calculation scenario. Further, the variant can be a form or version that differs in some respect from other forms. In the example, "profit" is identified as a "measure" and "Asia region" is identified as a "variant."

Further, the pre-defined analytical vocabulary can have further semantics for identifying importance between groups of measure and corresponding dimensions. For example, when the user desires to know details of product "X", where the measure is not explicitly stated, all the measures associated with product "X" is considered. Then, priority based on context and importance is determined. In the pre-defined analytical vocabulary, each measure and dimension corresponds to a semantic importance number and areas corresponding to the UAP determine the context. For example, for human resource manager, the "headcount" measure can have higher priority than "sales", so in a context if both these measures appear, the "headcount" will have higher priority.

In an embodiment, the mapping engine 220 includes unique analytical profile (UAP) 250 and business data artifacts 260. The personal information component of the UAP 250 includes personal information or analytical profiles of users such as, but not limited to names, location, employee identification number and user roles in the organization. Further, based on the UAP 250, the business data artifacts 260 are extracted. In other words, the UAP 250 is a personal information component used as a filter applied while performing analysis in the real-time environment. Further, upon applying UAP 250 as the first filter, the business data artifacts 260, i.e., a business data component is applied as a second filter. The business data component includes information related to the user specifically having to do with business information, such as projects and products of interest. In one example, the business data component could be configured to store information relating to a specific business enterprise, for example sales data, customer data, and/or vendor data.

In one exemplary embodiment, the UAP 250 and the business data artifacts 260 are received from an in-memory computing module associated with a high performance analytic appliance (HANA). In-memory computing is the storage of information in the main random access memory (RAM) of dedicated servers rather than in a relational databases operating on comparatively slow disk drives. Further, the in-memory computing helps business customers to quickly detect patterns, analyze massive data volumes on the fly, and perform their operations quickly. Therefore, the visualization analysis is cascaded through the UAP of the user and provides data relevant to a personal business role of the user. As an example, the UAP 250 and the business data artifacts 260 provide clearance level privileges to prevent non-authorized users from seeing confidential data related to the organization.

Figure 3:
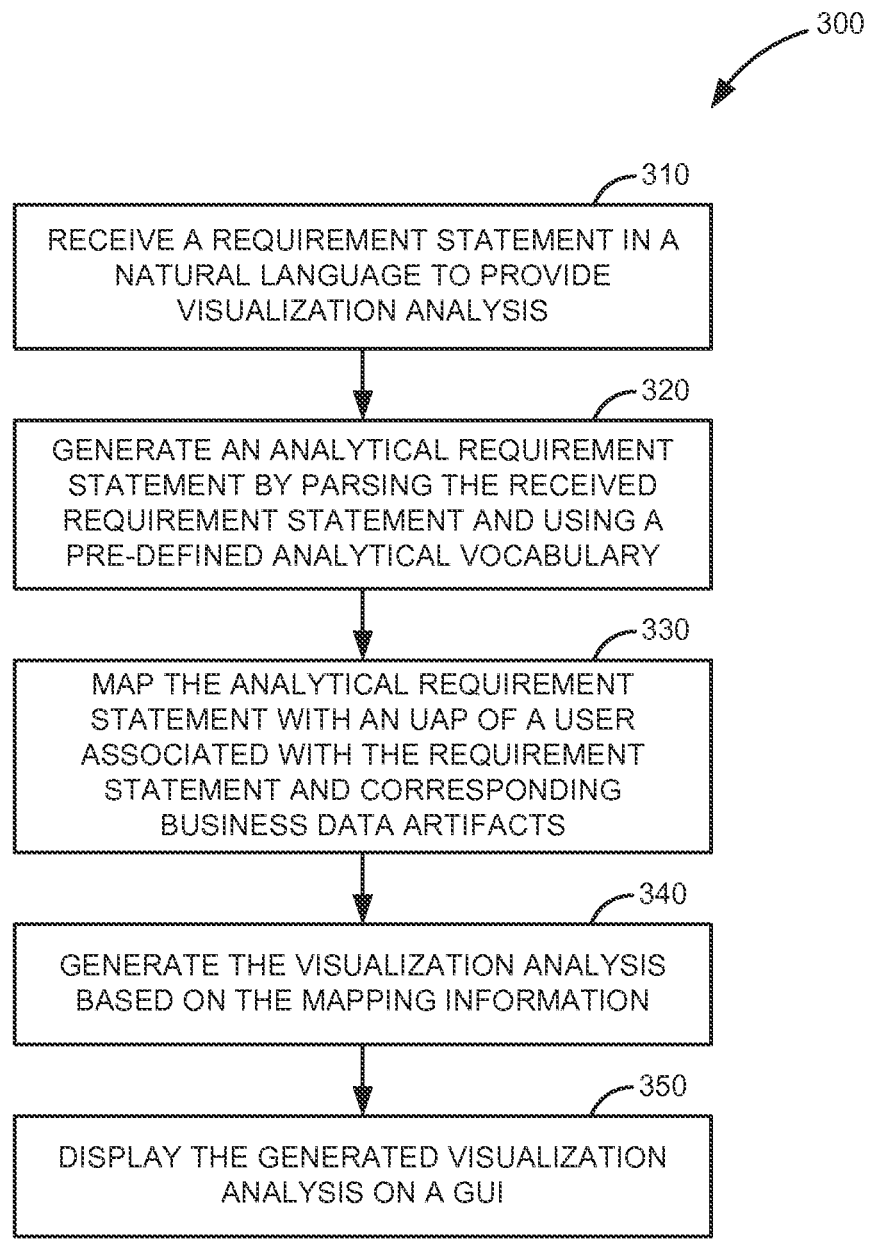
FIG. 3 is a flow diagram illustrating a process to provide real-time analytical visualization based on intent, according to an embodiment.

FIG. 3 is a flow diagram illustrating process 300 to provide real-time analytical visualizations based on intent, according to an embodiment. At 310, a requirement statement in a natural language is received, at real-time, to provide visualization analysis, e.g., KPIs. The requirement statement states intent of a user in the natural language and credentials of the user. The user can be, but not limited to a team member, a manager, a group of users (e.g., C-level Users (CXOs)). The requirement statement can be received via an input device such as, but not limited to a keyboard, a voice recorder and a touchscreen.

At 320, an analytical requirement statement is generated by parsing the received requirement statement and using a pre-defined analytical vocabulary g by a semantic engine. The requirement statement, which is in the form of natural language, is analyzed to break down in a form understood by a computer. The natural language processing uses named entity recognition (NER) for identifying analytical entities by assigning analytical constructs with data artifacts based on the pre-defined analytical vocabulary. For example, "measures", "type", "dimension" and "variants" are assigned to the requirement statement, which is described in a greater detail in FIG. 5.

At 330, the analytical requirement statement is mapped with a unique analytical profile (UAP) of a user associated with the requirement statement and corresponding business data artifacts. In one exemplary embodiment, credentials such as identifying information of the user, who provided the requirement statement, is retrieved from the requirement statement, for example, through log-in details. Also, the identifying information can be received from a system server. The system server or a database associated with the system server, hosts information related to the user. Information hosted in the system server can include an employee identification number, an employee name, employee location, and a user name. The system server hosting identifying information regarding the user is in an example embodiment of a Human Capital Management system (HCM). The identifying information received from the user and/or the system server is in the form of objects. For example, the identifying information includes personal data objects for the user.

According to an example embodiment, the identifying information is received from at least one independent data hosting system. The independent data hosting systems can be more than one of the same type of system or several systems of different types. According to an example embodiment, the at least one independent data hosting system includes at least one of an Analytical Privileges (AP) system, a Project Responsibilities system, a HCM system, a Business Intelligence (BI) system, Customer Relationship Management (CRM) system, or a Virtual Data Mart (VDM) system. Information hosted on these systems could include information such as: projects, responsibilities for projects, project hierarchy, products, sales for products, analytical privileges, and other pertinent information necessary for generating the KPI. Further, the identifying information received is in the form of objects. For example, the requested information from a Project Responsibilities system includes objects related to the projects with which the user is involved.

In one embodiment, the UAP is applied in the real-time environment. According to an example embodiment, the UAP is assigned to a group of people, such as a department, an organization, or a group of people having a same job description or title. Further, the UAP is assigned to a task and the users associated with the performance of the task. The UAP can be included in a dashboard filter, including a plurality of UAPs for different users, where the dashboard filter applies the appropriate UAP for each of the users. UAP filter set includes data from across various systems and their respective databases. Specific information that is identified as filtering criteria in a UAP can include: user, role, user language, data format, client information, user location (country, city), user organization, user job profile, product, product category, projects for which the user is responsible, and analytics privileges of the user. These various criteria and other available identifiable criteria, are molded to form the UAP filter set.

Further, based on the applied UAP, the analytical requirement statement is mapped with corresponding business data artifacts. The business data artifacts include information related to the user specifically having to do with business information, such as projects and products of interest. At 340, the visualization analysis is generated based on the mapping information. At 350, the generated visualization analysis is displayed on a computer generated graphical user interface (GUI). Therefore, the method provides the user to get the visualization analysis (e.g., KPIs) in real-time along with a report or desired chart and removes the burden of creating and configuring KPIs during design-time by a data analyst and provides the KPIs based on the requirement statement during real-time.

Thereby, the visualization analysis is provided based on intent of the user. For example, if the requirement statement "show me the details of the product "X" across three months" is received, a chart is automatically generated with the "sales" of product "X" as main measure and three months as dimension value. Although the user did not explicitly mention "sales" in the requirement statement, using the pre-defined analytical vocabulary, the natural language processor identifies the measures required for the details of the dimension value specified for product "X", so the result might bring up multiple measures such as "sales", "shipped goods", "defects", "invoice received", "stock" and the like. Further, an adhoc dashboard is generated showing "sales" as the main chart and other measures shown in related or suggested charts. However, the main chart may include supplementary measure along with main measure to render the chart.

Further, it is appreciated that the method can be extended to generate contextual KPIs while working with a business context. For example, while working with a sales related KPI, manager's dashboard or a business score card can be augmented with various contextual KPIs such as total rebate or discount offered, marketing spend of the team, and the like. Further, the manager can select one this intent and refine it to the exact business need.

Figure 4:
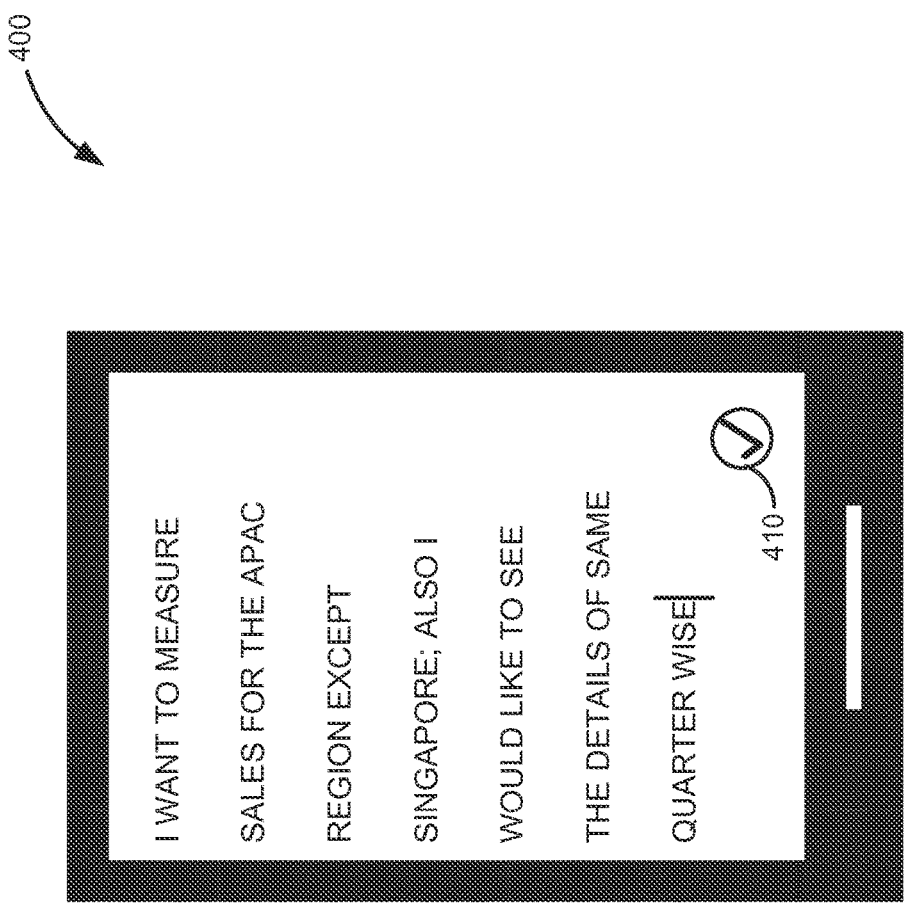
FIG. 4 shows an exemplary graphical user interface (GUI) of a user device depicting an exemplary requirement statement, according to an embodiment.

FIG. 4 shows an exemplary graphical user interface (GUI) of user device 400 depicting an exemplary requirement statement, according to an embodiment. At real-time, each of the users can access the KPI related information in a respective GUI. In one exemplary embodiment, the GUI can be software, a plug-in, or an application run on one of a cellular phone, a personal computer, a tablet, a laptop, a PDA, and other electronic devices. The GUI can also be structured in an Internet browser such that a webpage, website, or portal page on the Internet or an Intranet and provides access to the KPI related information. The user may need to provide authorization credentials to access the data made available through the KPI software.

In one embodiment, the user provides the requirement statement in a natural language. The requirement statement can be "I want to measure Sales for the APAC region except Singapore; also I would like to see the details of same quarter wise", for instance. Further, the user submits the request, for example, by clicking a "submit" button or by entering an "enter" key or by clicking on an "okay" button (e.g., 410).

In one exemplary embodiment, the requirement statement can be provided as a voice input, where the user states the requirement and an application converts speech to text and is further analyzed as a text input.

FIG. 5 shows an exemplary analytical requirement statement, according to an embodiment. The requirement statement as shown in FIG. 4, received from a user, is sent to a semantic engine. The semantic engine breaks down the requirement statement to understand analytical requirements using natural language processing. The natural language processor uses extended named entity recognition (NER) for identifying analytical entities using the pre-defined analytical vocabulary. For example, "I want to measure Sales", "get me number of sales across" and "I want to track Sales" means the same NER identifies measure "Sales", Sales is a measure looking for. Similarly, other entities with respect to the requirement statement of FIG. 4 "I want to measure Sales for the APAC region except Singapore; also I would like to see the details of same quarter wise" are depicted in Table 1, where "APAC region" is identified as a variant and "details of same quarter wise" is identified as a chart that needs to be rendered with dimension "quarter." Further, the analytical requirement statement corresponding to the requirement statement of FIG. 4 is graphically depicted in FIG. 5.

TABLE 1

| Natural Language | NER |
| --- | --- |
| I want to measure Sales of . . . | Measure: Sale (sale, global sales, net sale and the like,) will be looked up in a data repository. |
| I want to track Sales of . . . | |
| I want to calculate Sales for . . . | |
| For the APAC Region | Variant: APAC Region |
| Details of same quarter wise | Chart needs to render with dimension: quarter, and Measure: Sales, with Variant: APAC Region |

Figure 6:
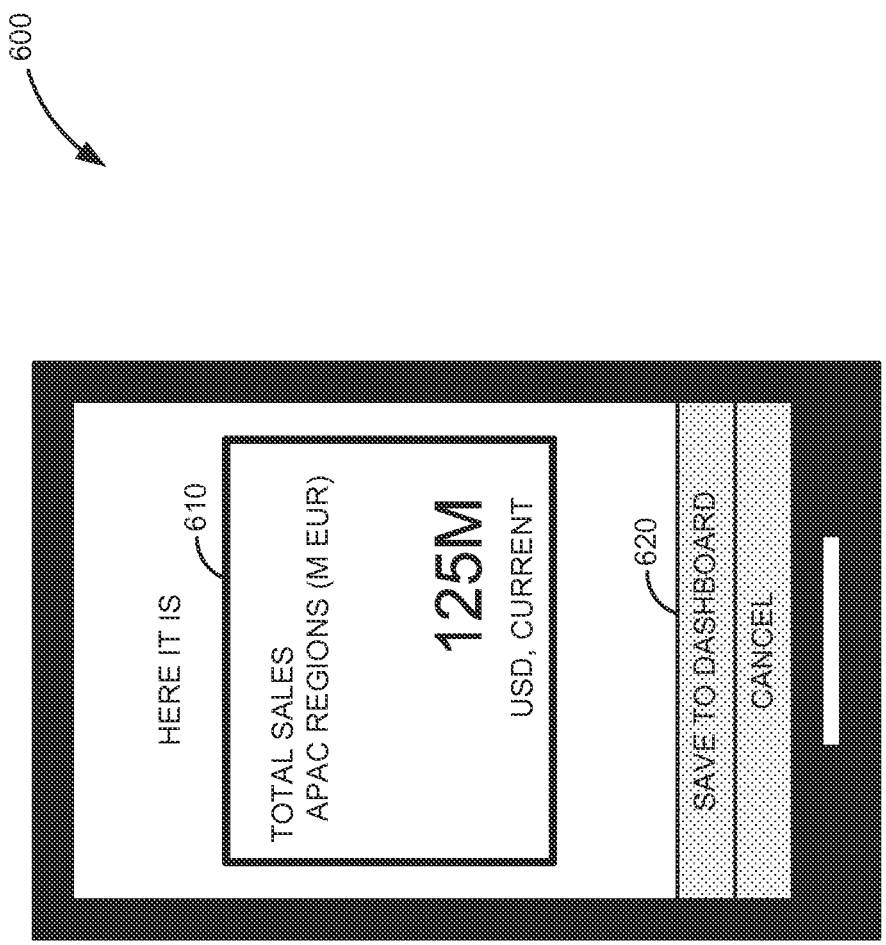
FIG. 6 shows a graphical user interface (GUI) of a user device depicting generated visualization analysis based on a requirement statement, according to an embodiment.

FIG. 6 shows a graphical user interface (GUI) of user device 600 depicting generated visualization analysis based on a requirement statement, according to an embodiment. A mapping engine of a semantic engine maps an analytical requirement statement of FIG. 5 between an analytical profile of a user and business data artifacts. The analytical profile may include personal variants and details like analytical privileges, location, project responsibility and the like. Further, when the user has privileges to see the requested data and the requested data artifacts exist in the backend server, the mapping is successful. Further, based on the mapping information, the visualization analysis (e.g., KPIs) are generated and displayed on the GUI of user device 600. It is appreciated that the method described in FIG. 3 can be implemented for other visualization analysis such as adhoc dashboards, chart visualization and the like, and not restricted to KPIs.

In one exemplary embodiment, the GUI of the user device 600 includes one or more portions to depict the generated KPIs based on the analytical statement of FIG. 5. For example, portion 610 includes generated KPIs. Further, an option is provided to save the generated KPIs on a dashboard (e.g., 620), for instance. In addition, the requirement statement and the corresponding analytical requirement statement are cached for better user experience (UX) in future. For example, when the user tries to provide a requirement statement, an auto suggestion can be provided with valid data constructs as depicted in Table 2.

TABLE 2

| Original requirement statement | Final rendered statement |
| --- | --- |
| I want to measure Sales for the APAC region; also I would like to see the details of same quarter wise | I want to measure the *NetSales* of *APAC region in a Numeric Tile* Format, on click of it show the *Bar Chart* rendered with dimension of *quarter* |

Therefore, when the mapping is successful, the application renders the KPIs using visualization templates available for the first level (e.g., Tile) and for the details level (e.g., Chart). Also, the initial intent is now incremented or substituted with proper data artifacts and the visualization template as shown in Table 2. In one exemplary embodiment, the data artifacts are highlighted (e.g., "Net Sales", "APAC region in a Numeric Tile", "Bar Chart" and "quarter"), which can be clicked to show other options available and to tweak the rendered charts in real time.

Figure 7:
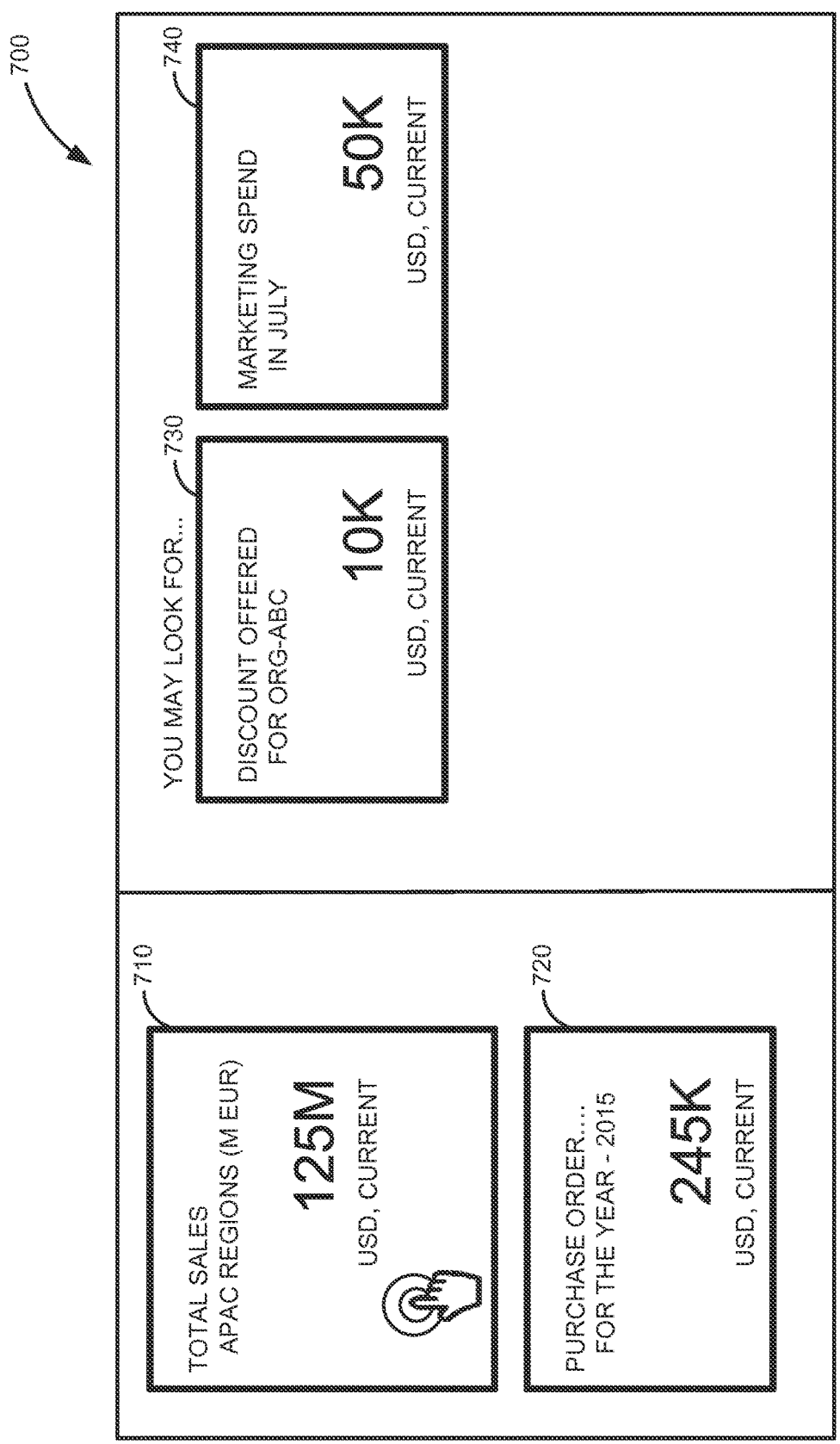
FIG. 7 shows a graphical user interface (GUI) of a user device depicting auto suggestion of visualization analysis, according to an embodiment.

FIG. 7 shows a graphical user interface (GUI) of user device 700 depicting auto suggestion of visualization analysis, according to an embodiment. The GUI includes one or more portions (e.g., 710, 710, 730 and 740). Portion 710 displays generated KPIs based on requirement statement. Further, portion 720 includes closer KPI corresponding to the generated KPIs.

In one exemplary embodiment, an auto suggestion of visualization of KPIs based on the requirement statement is displayed in portions 730 and 740. For example, KPIs corresponding to "discount offered for ORG-ABC" and "marketing spend in July" are displayed which may be of interest to the user who intended to visualize KPI of "total sales for APAC regions."

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data andior otherwise interact with the computer system 800. One or more of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to:

receive a requirement statement from a user in a natural language to automatically generate and provide visualization of key performance indicators (KPIs);
generate, by a semantic engine, an analytical requirement statement corresponding to the received requirement statement by:
  parsing the received requirement statement to automatically determine analytical entities in the received requirement statement based on a pre-defined analytical vocabulary, wherein the analytical entities comprise types, measures, dimensions and variants, and wherein the pre-defined analytical vocabulary comprises semantics for identifying association between the measures and corresponding dimensions;
map in real-time, by the semantic engine, the generated analytical requirement statement with an analytical profile of the user;
extract data artifacts corresponding to the analytical profile of the user based on the generated analytical requirement statement;
generate the visualization of the KPIs relevant to the user based on the analytical profile of the user and the extracted data artifacts; and
render in real-time on a graphical user interface (GUI) the generated visualization of the KPIs relevant to the user based on the requirement statement provided by the user.

2. The non-transitory computer-readable medium of claim 1, wherein the analytical profile and the data artifacts are received from an in-memory computing module associated with a high performance analytic appliance (HANA).

3. The non-transitory computer-readable medium of claim 1, wherein the requirement statement states an interest of the user in evaluating the KPIs in the natural language.

4. The non-transitory computer-readable medium of claim 1, wherein the analytical requirement statement comprises a formal constructed language designed to communicate instructions to the computer based on the requirement statement.

5. The non-transitory computer-readable medium of claim 1, wherein the analytical profile comprises personal information of the user.

6. The non-transitory computer-readable medium of claim 1, wherein the data artifacts comprise business information related to the user.

7. The non-transitory computer-readable medium of claim 1, further comprising instructions which when executed by the computer cause the computer to: provide an auto suggestion with valid data constructs corresponding to the requirement statement.

8. A computer implemented method to provide intent based analytical visualizations, the method comprising:
receiving a requirement statement from a user in a natural language to automatically generate and provide visualization of key performance indicators (KPIs);
generating, by a semantic engine, an analytical requirement statement corresponding to the received requirement statement by:
  parsing the received requirement statement to automatically determine analytical entities in the received requirement statement based on a pre-defined analytical vocabulary, wherein the analytical entities comprise types, measures, dimensions and variants, and wherein the pre-defined analytical vocabulary comprises semantics for identifying association between the measures and corresponding dimensions;
mapping in real-time, by the semantic engine, the generated analytical requirement statement with an analytical profile of the user;
extracting data artifacts corresponding to the analytical profile of the user based on the generated analytical requirement statement;
generating the visualization of the KPIs relevant to the user based on the analytical profile of the user and the extracted data artifacts; and
displaying in real-time on a graphical user interface (GUI) the generated visualization of the KPIs relevant to the user based on the requirement statement provided by the user.

9. The computer implemented method of claim 8, wherein the analytical profile and the data artifacts are received from an in-memory computing module associated with a high performance analytic appliance (HANA).

10. The computer implemented method of claim 8, wherein the requirement statement states an interest of the user in evaluating the KPIs in a natural language.

11. The computer implemented method of claim 8, wherein the analytical requirement statement comprises a formal constructed language designed to communicate instructions to the computer based on the requirement statement.

12. The computer implemented method of claim 8, wherein the analytical profile comprises personal information of the user.

13. The computer implemented method of claim 8, wherein the data artifacts comprise business information related to the user.

14. The computer implemented method of claim 8, further comprising: providing an auto suggestion with valid data constructs corresponding to the requirement statement.

15. A computer system to provide intent based analytical visualization, the computer system comprising:
at least one processor; and
one or more memory devices communicative with the at least one processor, wherein the one or more memory devices store instructions to:
  receive requirement statement from a user in a natural language to automatically generate and provide visualization of key performance indicators (KPIs);
  generate an analytical requirement statement corresponding to the received requirement statement by:
    parsing the received requirement statement to automatically determine analytical entities in the received requirement statement based on a pre-defined analytical vocabulary, wherein the analytical entities comprise types, measures, dimensions and variants, and wherein the pre-defined analytical vocabulary comprises semantics for identifying association between the measures and corresponding dimensions;
  map in real-time the generated analytical requirement statement with an analytical profile of the user;
  extract data artifacts corresponding to the analytical profile of the user based on the generated analytical requirement statement;
  generate the visualization of the KPIs relevant to the user based on the analytical profile of the user and the extracted data artifacts; and
  display in real-time on a graphical user interface (GUI) the generated visualization of the KPIs relevant to the user based on the requirement statement provided by the user during runtime.

16. The computer system of claim 15, wherein the analytical profile and the data artifacts are received from an in-memory computing module associated with a high performance analytic appliance (HANA).

17. The computer system of claim 15, wherein the requirement statement states an interest of the user in evaluating the KPIs in a natural language.

18. The computer system of claim 15, wherein the analytical requirement statement comprises a formal constructed language designed to communicate instructions to the computer based on the requirement statement.

19. The computer system of claim 15, wherein the analytical profile comprises personal information of the user.

20. The computer system of claim 15, wherein the data artifacts comprise business information related to the user.

* * * * *